US010480539B2

(12) United States Patent
Arikawa

(10) Patent No.: US 10,480,539 B2
(45) Date of Patent: Nov. 19, 2019

(54) ACCUMULATOR

(71) Applicant: Eagle Industry Co., Ltd., Tokyo (JP)

(72) Inventor: Tatsuhiro Arikawa, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/778,996

(22) PCT Filed: Dec. 13, 2016

(86) PCT No.: PCT/JP2016/087013
§ 371 (c)(1),
(2) Date: May 24, 2018

(87) PCT Pub. No.: WO2017/122481
PCT Pub. Date: Jul. 20, 2017

(65) Prior Publication Data

US 2018/0347597 A1 Dec. 6, 2018

(30) Foreign Application Priority Data

Jan. 13, 2016 (JP) ................................ 2016-004743

(51) Int. Cl.
*F16L 55/04* (2006.01)
*F15B 1/10* (2006.01)

(52) U.S. Cl.
CPC .......... *F15B 1/103* (2013.01); *F15B 2201/20* (2013.01)

(58) Field of Classification Search
CPC ......... F15B 1/103; F15B 1/10; F15B 2201/20
(Continued)

(56) References Cited

U.S. PATENT DOCUMENTS 2,283,439 A * 5/1942 Herman .................... F15B 1/10 138/30
2,543,585 A * 2/1951 Miller ....................... F15B 1/10 138/30

(Continued)

FOREIGN PATENT DOCUMENTS

CN 102227563 10/2011 ................ F15B 1/08
EP 0391320 4/1990 .............. F15B 1/047

(Continued)

OTHER PUBLICATIONS

International Preliminary Report on Patentability issued in application No. PCT/JP2016/087013, dated Jul. 26, 2018 (7 pgs).

(Continued)

*Primary Examiner* — James F Hook
(74) *Attorney, Agent, or Firm* — Hayes Soloway P.C.

(57) ABSTRACT

An accumulator includes a pressure container, a tubular bellows, a bellows cap divisionally defining a liquid chamber and a gas chamber in cooperation with the bellows. A stay provided with a through hole partitions the liquid chamber into a closed liquid chamber on a side of the bellows and an open liquid chamber on a side of the liquid pressure port. The bellows cap includes an elastic abutment part provided with an annular sealing part positioned around the through hole to face the through hole, a buffering part is positioned on a radially inner side of the sealing part, and communication passages always communicating with the through hole are formed in the buffering part of the elastic abutment part.

3 Claims, 11 Drawing Sheets

(58) Field of Classification Search
USPC .......................................................... 138/30, 31
See application file for complete search history.

(56) References Cited

U.S. PATENT DOCUMENTS

| | | | | |
|---|---|---|---|---|
| 4,997,009 | A * | 3/1991 | Niikura | B60G 17/0424 138/30 |
| 6,286,552 | B1 * | 9/2001 | Shimbori | B23K 11/002 138/30 |
| 6,612,339 | B1 * | 9/2003 | Wilke | B60T 8/368 138/30 |
| 6,789,576 | B2 * | 9/2004 | Umetsu | F15B 1/103 138/30 |
| 6,871,670 | B2 * | 3/2005 | Suzuki | B60T 13/14 138/26 |
| 8,365,772 | B2 | 2/2013 | Arikawa et al. | 138/30 |
| 8,523,001 | B2 * | 9/2013 | Acker | F16J 3/02 220/581 |
| 2010/0108168 | A1 | 5/2010 | Ota et al. | 138/30 |
| 2011/0226370 | A1 * | 9/2011 | Arikawa | F15B 1/103 138/30 |
| 2014/0311604 | A1 * | 10/2014 | Yoshihara | F15B 1/08 138/30 |
| 2015/0204357 | A1 * | 7/2015 | Hyodo | F15B 1/103 138/30 |
| 2015/0240839 | A1 * | 8/2015 | Mizukami | F15B 1/083 138/31 |

FOREIGN PATENT DOCUMENTS

| | | | |
|---|---|---|---|
| EP | 2910794 | 8/2015 | F15B 1/08 |
| JP | 3148349 | 2/2009 | F15B 1/08 |
| JP | 2010112431 | 5/2010 | F15B 1/08 |
| JP | 2010151286 | 7/2010 | F15B 1/08 |
| JP | 2010174985 | 8/2010 | F15B 1/08 |

OTHER PUBLICATIONS

International Search Report (w/translation) and Written Opinion (no translation) issued in application No. PCT/JP2016/087013, dated Feb. 21, 2017 (8 pgs).
Chinese Office Action (w/translation) issued in application No. 201680071175.9 dated May 27, 2019 (12 pgs).
European Extended Search Report issued in application No. 16885084.0, dated Jul. 23, 2019 (5 pgs).

* cited by examiner

ACCUMULATOR

TECHNICAL FIELD

The present invention relates to an accumulator to be used in a hydraulic circuit.

BACKGROUND ART

Conventionally, as a pressure storage device or a pulse pressure damping device, an accumulator provided with a metal bellows is used. In this type of accumulator, for example as shown in Patent Citation 1, a cylindrical metal bellows is arranged in a pressure container in which a shell and a lid body are integrated by welding or the like. One end of the metal bellows is closed by a cap, and the pressure container is divided into a gas chamber and a liquid chamber by the metal bellows and the cap. In a housing, a substantially cup-shaped stay having a through hole formed in the center of its bottom part is arranged upside down. When the metal bellows is compressed by gas pressure in accordance with the reduction of the pressure in the liquid chamber, a lower end of the cap is supported by the stay. Thus, even when the pressure of the liquid chamber is lowered, the metal bellows is maintained to have desired length by the stay. A sealing rubber is attached to a lower part of the cap. The sealing rubber has an annular projecting part provided with an oblique side part on the inner diameter side, another oblique side part on the outer diameter side, and a flat part coupling both the oblique side parts.

When stored pressure is discharged from an oil port, the cap is moved toward the stay by the gas pressure, and the annular projecting part is abutted with the bottom part of the stay and crushed up so as to seal a part around the through hole. In detail, after the flat part serving as a sealing part of the annular projecting part is abutted with the bottom part of the stay, the annular projecting part is crushed up, and in addition to the flat part serving as the sealing part, the oblique side part on the inner diameter side serving as a buffering part is also brought into a state where the oblique side part is closely attached to the bottom part of the stay. This state is called as a zero-down state. Therefore, by the metal bellows and the stay, the liquid chamber is partitioned into a closed liquid chamber between the inner side of the metal bellows and the outer side of the stay and an open liquid chamber positioned on the inner side of the stay, the open liquid chamber communicating with the oil port.

In such a way, in the zero-down state where the cap is abutted with the bottom part of the stay, the closed liquid chamber is formed between a stay outer peripheral face and the metal bellows. Even when the gas pressure acts on the metal bellows from the outer side, liquid pressure acts from the inner side. Thus, without generating great pressure imbalance in the metal bellows, damage to the metal bellows can be suppressed. When the zero-down state shifts to a normal operation state, the liquid pressure held in the closed liquid chamber formed between the stay outer peripheral face and the metal bellows acts in the direction in which the cap is separated from the stay as so-called pressurization, so as to contribute to the separation of the cap from the stay.

CITATION LIST

Patent Literature

Patent Citation 1: Japanese Laid-open Patent Publication 2010-174985 ({0027} to {0032} and FIG. 1)

SUMMARY OF INVENTION

Technical Problem

As described above, in the conventional accumulator, the section of the annular projecting part of the rubber attached to the lower part of the cap has the oblique side part on the inner diameter side, the oblique side part on the outer diameter side, and the flat part coupling both the oblique side parts. The oblique side part provided in the annular projecting part of the rubber functions as the buffering part that receives a load in the vicinity of the sealing part in order to suppress the flat part serving as the sealing part from repeating deformation and deteriorating. At the time of zero-down, the annular projecting part is crushed up in the up and down direction, and in addition to the flat part serving as the sealing part, the oblique side part on the inner diameter side serving as the buffering part is also brought into a state where the oblique side part is closely attached to the bottom part of the stay. Therefore, at the time of operation resumption, the closely attached oblique side part serving as the buffering part does not instantaneously function as a pressure receiving face for a liquid. Thus, there is room for improvement in prompt separation of the cap from the stay. In particular, when the rubber is exposed to a low-temperature environment before operation resumption, elastic restorability (viscous elasticity) of the rubber itself is lowered. Thus, even when the liquid pressure acts from the open liquid chamber at the time of operation resumption, the shape of the rubber is not easily restored. That is, a gap is not easily generated between the oblique side part on the inner diameter side and the bottom part of the stay. Therefore, prompt separation of the cap from the stay becomes further difficult.

This invention has been contrived to resolve the problem described above, and an objective thereof is to provide an accumulator having a buffering action for protecting a sealing part from a stay, in which a bellows cap can be promptly separated from the stay at the time of a pressure boost in a pressure pipe.

An accumulator according to a first aspect of the present invention includes:

a pressure container including a liquid pressure port connected to a pressure pipe;

a tubular bellows arranged telescopically along an inner wall of the pressure container;

a bellows cap configured to close one end of the bellows to divisionally define, in cooperation with the bellows, a liquid chamber communicating with the liquid pressure port and a gas chamber in which a pressure gas is enclosed; and a stay provided with a through hole, the stay partitioning the liquid chamber into a closed liquid chamber on a side of the bellows and an open liquid chamber on a side of the liquid pressure port, and the accumulator is characterized in that:

the bellows cap includes an elastic abutment part provided with an annular sealing part positioned around the through hole to face the through hole, and a buffering part positioned on a radially inner side of the sealing part; and communication passages always communicating with the through hole are formed in at least one of the buffering part of the elastic abutment part and the stay in contact with the buffering part.

According to the first aspect, while the buffering part has a buffering action for protecting the sealing part from the stay, pressure is applied to a liquid in the communication passages at the time of a pressure boost in a pressure pipe and push-up force instantaneously acts on the bellows cap. Thus, the bellows cap biased by gas pressure can be promptly separated from the stay.

In a second aspect of the present invention, the accumulator may be characterized in that the communication passages are equiangularly arranged around the through hole of the stay.

According to the second aspect, the push-up force acts equally in the circumferential direction. Thus, without inclining the bellows cap by an unbalanced load, the bellows cap can be smoothly separated from the stay.

In a third aspect of the present invention, the accumulator may be characterized in that each of the communication passages is extended radially and linearly from the through hole of the stay toward the sealing part.

According to the third aspect, the push-up force acts instantaneously and equally up to the vicinity of the sealing part. Thus, without inclining the bellows cap by the unbalanced load, the bellows cap can be smoothly separated from the stay.

In a fourth aspect of the present invention, the accumulator may be characterized in that the communication passages are formed in the buffering part.

According to the fourth aspect, the buffering part exerts the buffering action by the gas pressure in a part other than the communication passages, and the pressure is applied to the liquid in the communication passages at the time of the pressure boost in the pressure pipe, so that the push-up force can instantaneously act on the bellows cap.

In a fifth aspect of the present invention, the accumulator may be characterized in that the communication passages comprise a plurality of radial grooves extending in the radial direction and at least one circumferential groove coupled to a radial grooves and extending in a circumferential direction.

According to the fifth aspect, a pressure receiving area for receiving liquid pressure by the communication passages can be expanded. Thus, the bellows cap can be promptly separated from the stay.

BRIEF DESCRIPTION OF DRAWINGS

FIG. 5A is the enlarged sectional view at the time when an annular projecting part is brought into contact with a seating face; FIG. 5B is the enlarged sectional view at the time when the annular projecting part is crushed up after the seating shown in FIG. 5A; and FIG. 5C is the enlarged sectional view illustrating a state immediately before the bellows cap is separated from the stay after the state shown in FIG. 5B.

FIG. 6A is the enlarged sectional view at the time when the annular projecting part is brought into contact with the seating face; FIG. 6B is the enlarged sectional view at the time when the annular projecting part is crushed up after the seating shown in FIG. 6A; and FIG. 6C is the enlarged sectional view illustrating a state immediately before the bellows cap is separated from the stay after the state shown in FIG. 6B.

FIG. 7A is a sectional view of the seal; and FIG. 7B is a bottom view of the seal.

FIG. 8A is a sectional view of the seal; and FIG. 8B is a bottom view of the seal.

FIG. 11A is a sectional view of the seal; and FIG. 11B is a bottom view of the seal.

DESCRIPTION OF EMBODIMENTS

Figure 1:
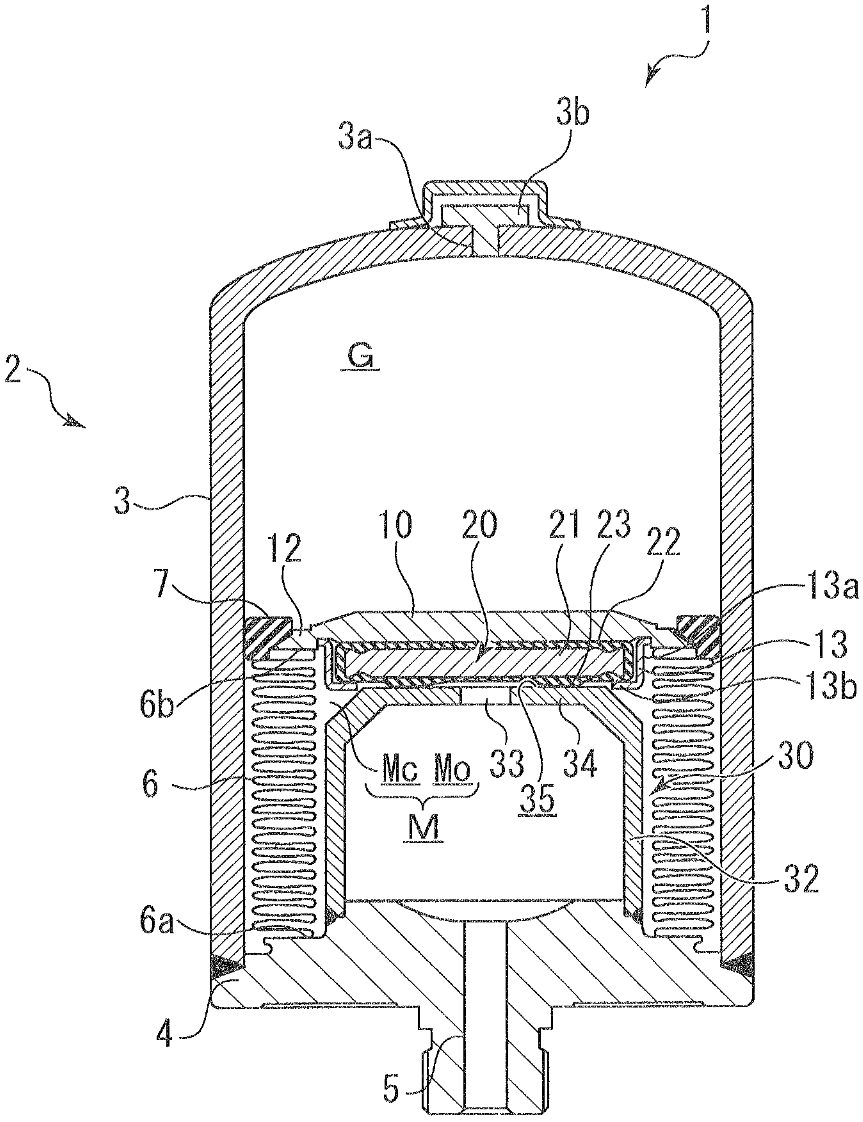
FIG. 1 is a sectional view of a first embodiment of the accumulator according to the present invention at the time when a bellows of the accumulator is compressed.

Modes for implementing the accumulator as in the present invention will be described on the basis of embodiments.

First Embodiment

The first embodiment of the accumulator according to the present invention will be described with reference to FIGS. 1 to 6. The upper and lower sides of the paper plane of FIG. 1 respectively correspond to the upper and lower sides of the accumulator in the following description.

An accumulator 1 is a metal bellows type accumulator using a metal bellows 6 as a bellows, and is mainly formed by a housing 2, the metal bellows 6, a bellows cap 10, and a stay 30. An interior of the housing 2 is always divided into a gas chamber G in which a high-pressure gas (such as a nitrogen gas) is enclosed and a liquid chamber M to which a liquid (such as a brake fluid) is supplied by the metal bellows 6 and the bellows cap 10. The gas chamber G is divided into a closed liquid chamber Mc and an open liquid chamber Mo by the bellows cap 10 and the stay 30 when liquid pressure in a pressure pipe (not shown) is lowered.

Detailed description will be given below. The housing 2 is formed by fixing (welding) a lid body 4 to an opening part of a cylindrical bottomed shell 3. The lid body 4 is provided with an oil port 5 which is connected to the pressure pipe (not shown). The housing 2 is not limited to the present structure. For example, the lid body 4 and the shell 3 may be an integrated body, or a bottom part of the shell 3 may be an end cover serving as a separate body from the shell 3. In any cases, a gas charging port 3*a* for charging the gas into the gas chamber G is provided in the bottom part of the shell 3 or a part corresponding to this, and closed by a gas plug 3*b* after charging the gas.

A fixed end 6*a* of the metal bellows 6 is fixed (welded) to an inner face of the lid body 4, and the disc shape bellows cap 10 is fixed (welded) to a free end 6*b* of the metal bellows. The accumulator 1 is an outside gas type accumulator in which the gas chamber G is provided on the outer peripheral side of the metal bellows 6. A guide 7 is attached to an outer peripheral part of the bellows cap 10 in such a manner that the metal bellows 6 and the bellows cap 10 are not in contact with an inner face of the shell 3. This guide 7 does not exert a sealing action but the gas can communicate in the up and down direction of the guide 7.

The bellows cap 10 is made of metal and formed in a disc shape. An outer peripheral edge 12 of the bellows cap is sealed and fixed to the above free end 6*b* of the metal bellows 6, so that the gas chamber G and the liquid chamber M are divided in a sealed state by the metal bellows 6 and the bellows cap 10. In a seal holder 13 made of sheet metal, an inward flange shape engagement part 13*b* running toward the radially inner side is integrated in one end (lower end) of a tubular attachment part 13*a*. The attachment part 13*a* is attached to a lower face of the bellows cap 10, and the inward engagement part 13*b* elastically presses and holds a seal 20 to the side of the bellows cap 10.

In the seal 20, the entire outer face of a disc shape rigid plate 21 made of metal, hard resin, or the like is covered with a rubber 22 (elastic body) by cure bonding. An outer peripheral edge part of the seal 20 is held by the engagement part 13*b* of the seal holder 13. On the lower side of the rubber 22 (on the side of the oil port 5), an annular projecting part 23 (elastic abutment part) projecting downward is formed. This annular projecting part 23 is freely connected to or separated from a seating face 35 of the stay 30. A section of the annular projecting part 23 has a steep oblique side part 24 continuing from a flat part 29 at an outer edge positioned on the outermost side in the radial direction, a gentle oblique side part 26 continuing from a flat center part 28 in center positioned on the innermost side in the radial direction, and a flat part 25 coupling both the oblique side parts 24, 26. The example that regarding the oblique side parts 24, 26, one on the radially inner side is gentle and the other on the radially outer side is steep is described here. However, such angles are not essential. Eight grooves 27 extending radially in the radial direction and being arranged at equal intervals are formed in the oblique side part 26. The grooves 27 cross the oblique side part 26 and part of the grooves extend to the center part 28. A lower face of the center part 28 and a lower face of the flat part 29 belong to the same plane. However, the lower faces may belong to different planes. In essence, both the lower faces are only required to be lower than the annular projecting part 23 (positioned on the upper side in FIG. 5). The number, width, and depth of the grooves can be appropriately changed. The material of the elastic body is not limited to rubber but may be anything having elasticity such as resin.

The stay 30 is a substantially cap-shaped structural body made of metal, hard resin, or the like, mainly formed by a tubular standing part 32, a bottom part 34, and a through hole 33 provided in center of the bottom part 34, and arranged in a substantially inverted state in the housing 2. An end part of the standing part 32 is liquid-tightly fixed to the lid body 4 by welding. The liquid can come and go between the closed liquid chamber Mc and the open liquid chamber Mo through the through hole 33. An upper face of the bottom part 34 serves as the seating face 35 on which the annular projecting part 23 of the seal 20 is seated. The sealing action is exerted when the annular projecting part 23 is seated on the seating face 35, so that the closed liquid chamber Mc and the open liquid chamber Mo are liquid-tightly closed.

Next, the operation of the accumulator 1 will be described.

<Operation (Working) at the Time of Normal Running>

Figure 2:
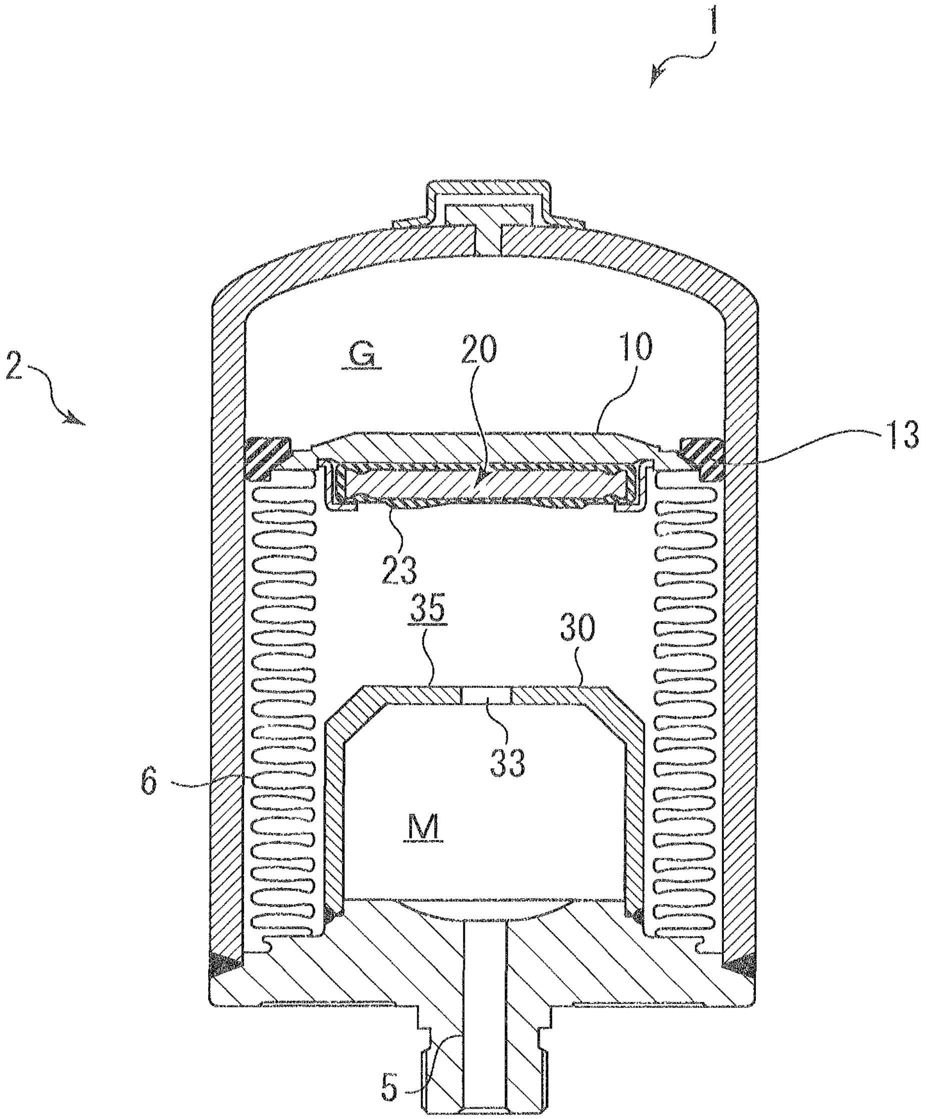
FIG. 2 is a sectional view of the first embodiment of the accumulator at the time when the bellows of the accumulator in the first embodiment is extended.
Figure 3:
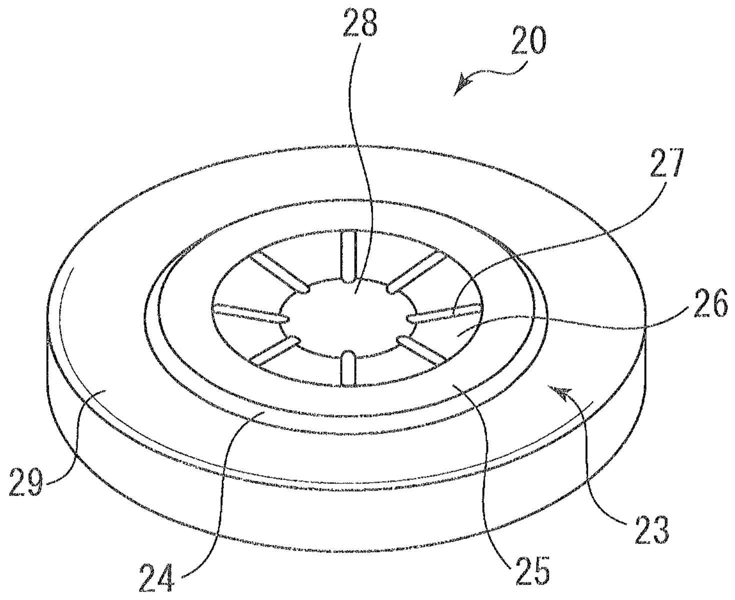
FIG. 3 is a perspective view illustrating a seal formed by a bellows cap shown in FIG. 1.
Figure 4A:
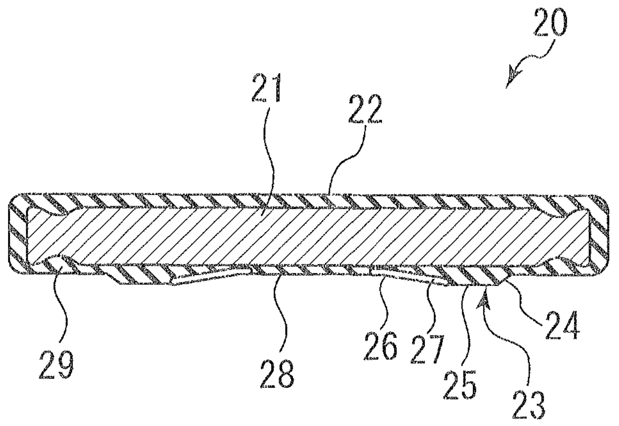
FIG. 4A is a sectional view of the seal in FIG. 1.
Figure 4B:
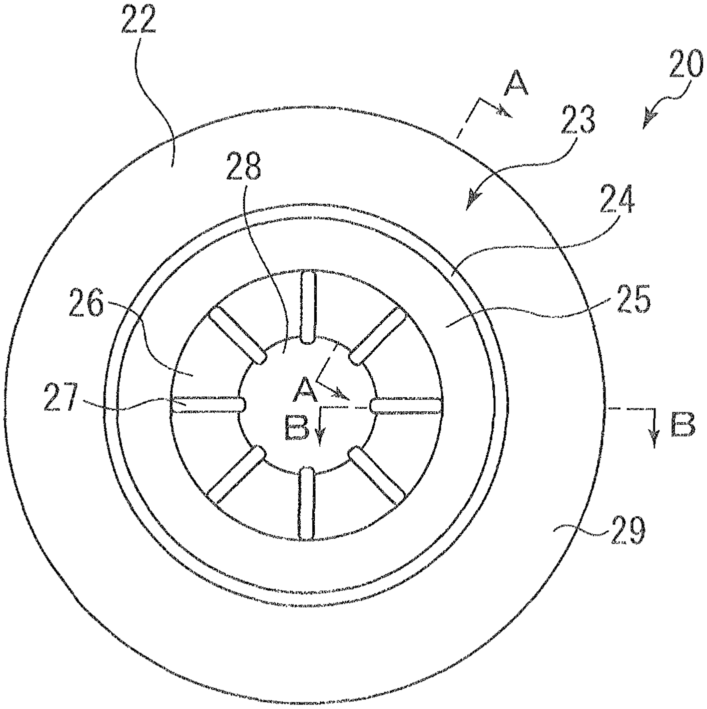
FIG. 4B is a bottom view of the seal.

The accumulator 1 is connected to a pressure pipe of a device (not shown) in the oil port 5. At the time of normal running of the device, as shown in FIG. 2, a high-pressure liquid is introduced from this pressure pipe into the liquid chamber M. Thus, the metal bellows 6 is extended and the bellows cap 10 is separated from the stay 30. In this state, the oil port 5 and the closed liquid chamber Mc and the open liquid chamber Mo communicate with each other through the through hole 33. The liquid of a proper pressure at that time is introduced from the oil port 5 as required, and the bellows cap 10 is moved in such a manner that the introduced liquid pressure and the gas pressure enclosed in the gas chamber G are balanced as required.

<At the Time of Zero-Down>

Figure 5A:
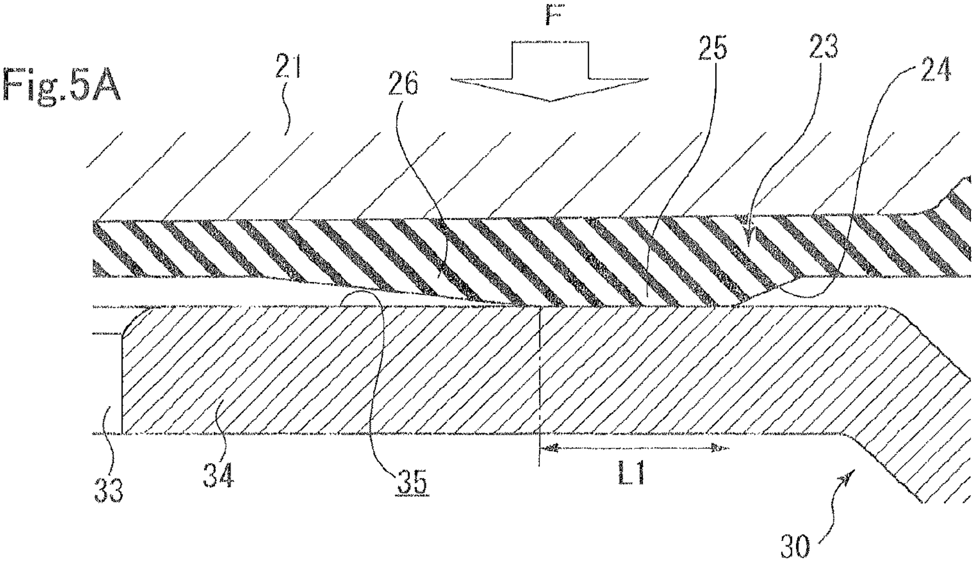
FIGS. 5A to 5C are enlarged sectional views illustrating contact states between a stay and the seal taken along the line A-A in FIG. 4B.
Figure 5B:
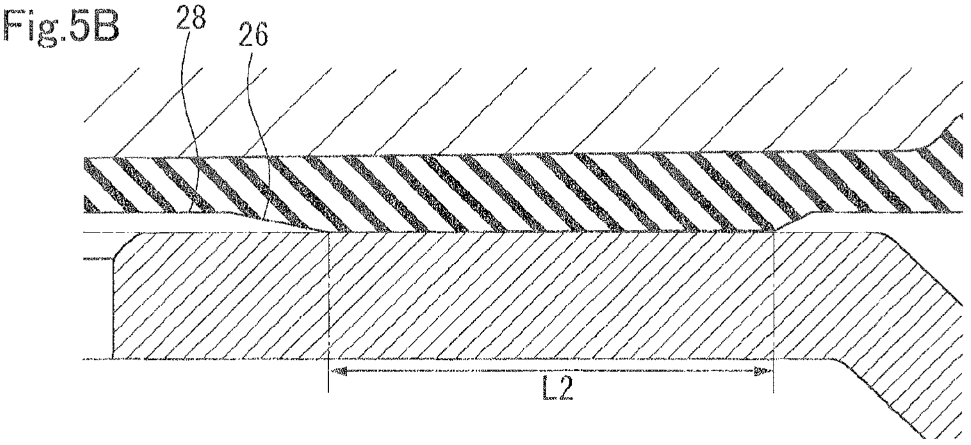
Figure 5C:
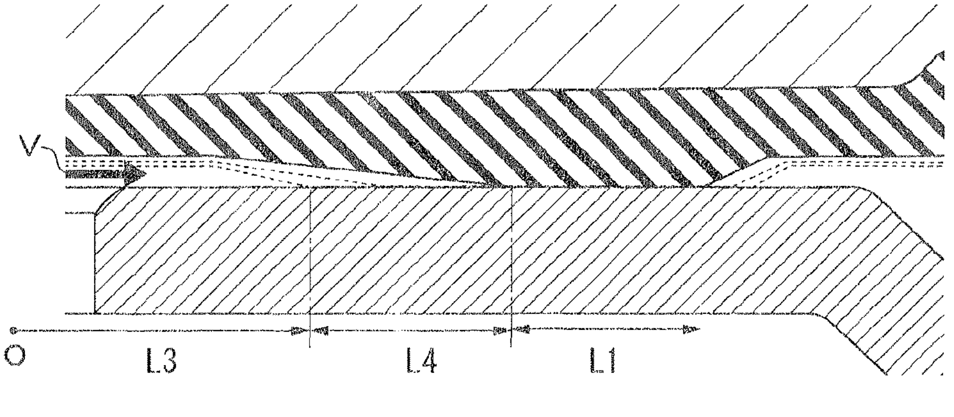
Figure 6A:
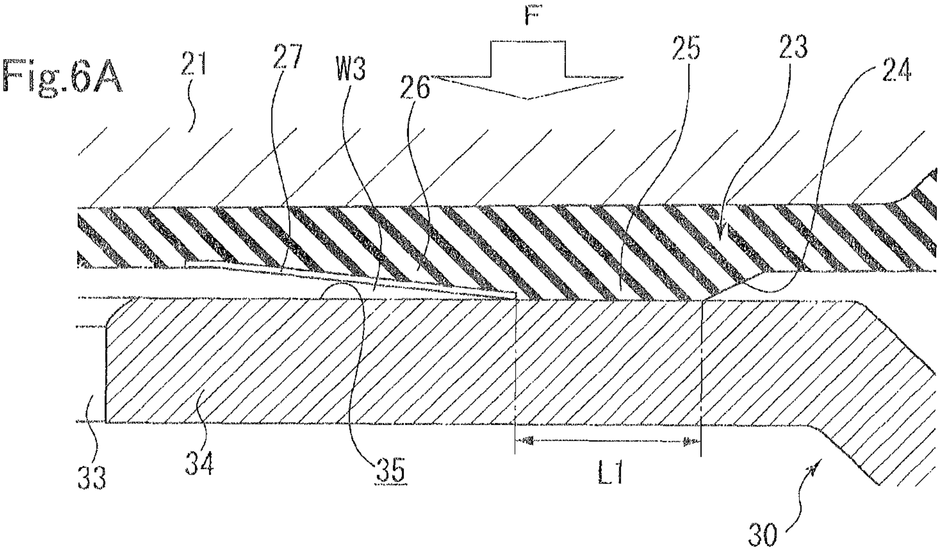
FIGS. 6A to 6C are enlarged sectional views illustrating contact states between the stay and the seal taken along the line B-B in FIG. 4B.
Figure 6B:
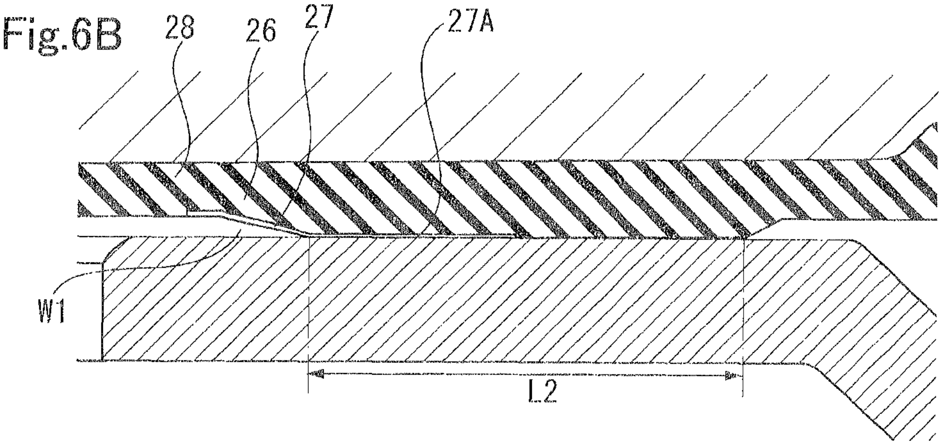
Figure 6C:
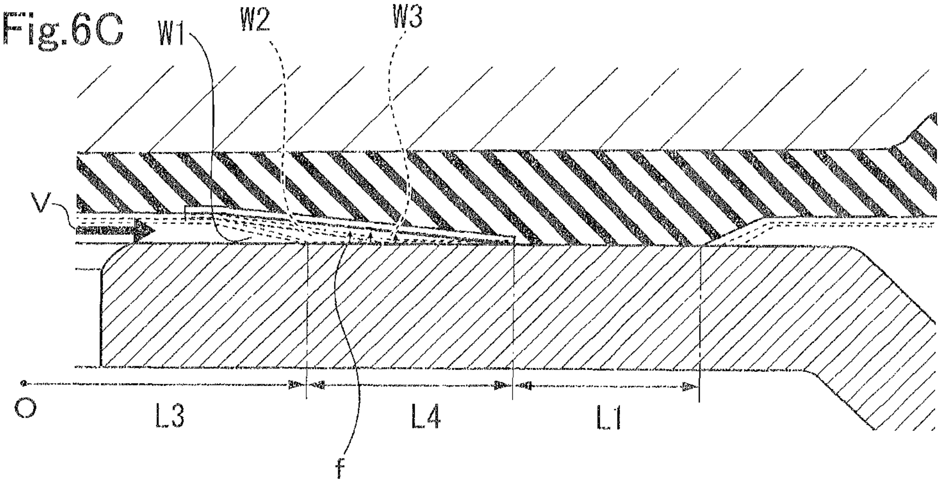

When, owing to the stop or the like of operation of the device from the state at the time of normal running, the pressure in the pressure pipe is lowered to be substantially zero, i.e., to reach the so-called zero-down state, the liquid in the liquid chamber M is gradually discharged from the oil port 5. Accordingly, as shown in FIGS. 1, 5 and 6, the bellows cap 10 is moved downward in accordance with contraction of the metal bellows 6, and thus the annular projecting part 23 of the bellows cap 10 is seated on the seating face 35 of the stay 30. As a result, the closed liquid chamber Mc and the open liquid chamber Mo are divided. In detail, first of all, the flat part 25 serving as a sealing part having radial length L1 of the annular projecting part 23 is brought into contact with the seating face 35 (FIGS. 5A and 6A). After that, the bellows cap 10 further receives pressing force F by the gas pressure, the annular projecting part 23 is crushed up, and the oblique side parts 24 and 26 serving as buffering parts which continue from the flat part 25 are partially elastically deformed and brought into contact with the seating face 35. That is, the annular projecting part 23 is brought into contact with the seating face 35 in a region having radial length L2 (FIGS. 5B and 6B). In such a way, in the annular projecting part 23, the flat part 25 has a function of ensuring a sealing property, and the oblique side parts 24 and 26, in particular, the oblique side part 26 having a larger deformation spread acts as the buffering part that disperses the pressing force F by the deformation thereof. Thus, the annular projecting part 23 has a function of suppressing mechanical damage to the seal 20 including the annular projecting part 23 and the rigid plate 21, the bellows cap 10, and the stay 30.

As described above, the closed liquid chamber Mc is closed and, as a result, part of the liquid (backup fluid) is enclosed in the closed liquid chamber Mc. Thus, a further pressure decline in the closed liquid chamber Mc is not generated. Accordingly, the liquid pressure and the gas pressure are balanced inside and outside the metal bellows 6. Damage to the metal bellows 6 is prevented by this balance of the pressure, and the liquid pressure held in the closed liquid chamber Mc acts as so-called pressurization at the time of shifting from zero-down to normal running, so as to contribute to prompt separation of the bellows cap 10 from the stay 30.

<At the Time of Shifting from Zero-Down State to Normal Running State>

When the zero-down state is canceled, the pressure of the liquid in the pressure pipe of the device (not shown) is boosted. This results in that the liquid flows into the accumulator from the oil port 5, and then the pressure of this liquid acts on the seal 20 so that the bellows cap 10 is separated from the stay 30 (details of movement immediately after introduction of the liquid will be described later). Successively, the liquid is introduced into the closed liquid chamber Mc, so that the bellows cap 10 is moved in the extending direction of the metal bellows 6 to a position where the liquid pressure and the gap pressure are balanced. Therefore, the accumulator is restored to the normal running state shown in FIG. 2.

With reference to FIGS. 5B and 6B, when the liquid is introduced from the oil port 5, the liquid pressure of the open liquid chamber Mo is boosted and acts on the center part 28 of the seal 20 and part of the oblique side part 26, that is, a circular region defined by the radius L3 from the center O of the seal 20. At the same time, since the grooves 27 communicate with the side of the open liquid chamber Mo (refer to FIG. 6B), the liquid is also introduced to pressure guiding parts 27A (communication passages) positioned in the oblique side part 26 brought into contact with the seating face 35. That is, the pressure of the liquid also acts on the pressure guiding parts 27A in addition to the above circular region (region corresponding to L3).

By this action of the liquid pressure, as the seal 20 is brought upward, the oblique side part 26 is gradually restored to the original shape. In addition, a wedge shape space formed between the oblique side part 26 and the seating face 35 is increased from a space W1 in the zero-down state, to a space W2 in an intermediate state, and further to a space W3 immediately after the oblique side part 26 is brought away from the seating face 35. In other words, a contact region L4 between the oblique side part 26 and the seating face 35 is gradually decreased, and a pressure receiving area contributing to bring-up of the seal 20 is increased. At the same time, as the seal 20 is brought upward, the grooves 27 are released from a compressed state and gradually restored to the original shape, and the groove volume is increased. Thus, the liquid acting on the grooves 27 is also increased. In such a way, the pressure receiving area of the spaces W1, W2, W3 and the grooves 27 is gradually increased, and due to a wedge effect by a flow V of the liquid flowing into the spaces W1, W2, W3 and the grooves 27, the annular projecting part 23 can be promptly separated from the seating face 35. In such a way, in order to separate the seal 20 from the stay 30, the pressure (impact force) of the liquid and separation force generated by the flow of the liquid are thought to act combinedly. It was confirmed by the experiments that the pressure required for separating the seal from the stay is lowered by about several percent in comparison to the seal described before as the background art, that is, the seal not having grooves 27 but having the oblique side part 26 smoothly continuing in the circumferential direction.

While the oblique side part 26 (buffering part) has the buffering action for protecting the flat part 25 (sealing part) from the stay 30, the pressure is applied to the liquid in the pressure guiding parts 27A (communication passages) of the grooves 27 at the time of the pressure boost in the pressure pipe. This means that push-up force instantaneously acts on the bellows cap 10 and thus the bellows cap 10 biased by the gas pressure can be promptly separated from the stay 30. Further, the pressure guiding parts 27A (communication passages) are formed in the oblique side part 26 (buffering part). Thus, the oblique side part 26 (buffering part) exerts the buffering action by the gas pressure in a part other than the pressure guiding parts 27A, and the pressure is applied to the liquid in the pressure guiding parts 27A at the time of the pressure boost in the pressure pipe, so that the push-up force can instantaneously act on the bellows cap 10.

The grooves 27 are equiangularly arranged around the through hole 33 of the stay 30. Therefore, the push-up force acts equally in the circumferential direction. Thus, without inclining the bellows cap 10 by an unbalanced load, the bellows cap 10 can be smoothly separated from the stay 30. Further, the grooves 27 are extended linearly and radially from the through hole 33 of the stay 30 toward the flat part 25. Thus, the push-up force acts through the radial direction, and the bellows cap can be smoothly separated from the stay.

Further, even in a case where, using in a cold district, the annular projecting part 23 of the seal 20 is not easily deformed at the time of zero-down, the seal 20 can be more promptly separated from the stay 30 than the seal described before as the background art. This is thought to be because by providing the grooves 27, the liquid is easily introduced to the grooves 27, and with the grooves 27 serving as brittle parts, the oblique side part 26 is easily mechanically deformed.

Second Embodiment

Next, the second embodiment of the accumulator according to the present invention will be described with reference to FIG. 7. The second embodiment is different from the first embodiment in terms of a shape of grooves provided in the seal 20. The same and duplicated configurations as the first embodiment will be omitted.

Figure 7A:
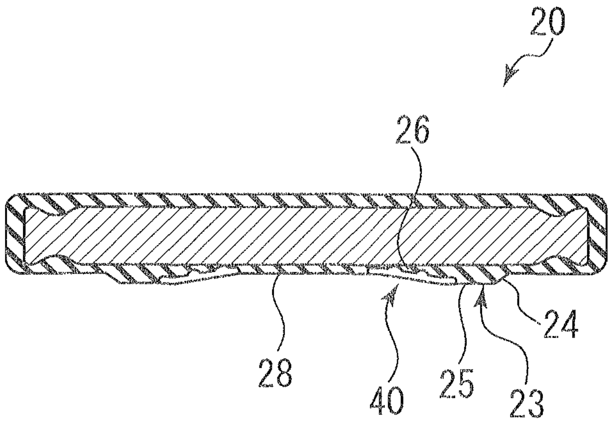
FIGS. 7A and 7B are views illustrating a seal in a second embodiment of the accumulator.
Figure 7B:
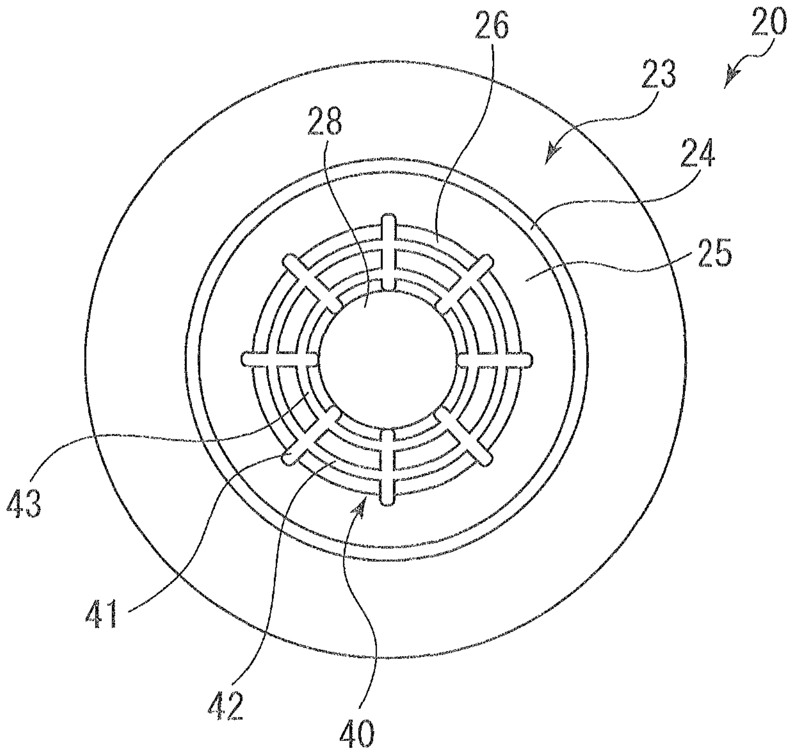

As shown in FIG. 7, a groove 40 in the second embodiment includes eight grooves 41 (in the same shape as the grooves 27 of the first embodiment) extending in the radial direction, and two annular grooves 42 and 43. The grooves 41 are connected to the annular grooves 42 and 43 in such a manner that the liquid can pass through. With such a configuration, a liquid guided in the radial direction by the grooves 41 is also guided in the circumferential direction by the annular grooves 42 and 43. Thus, the bellows cap 10 can be promptly separated from the stay 30. The oblique side part 26 is segmented in the radial direction and the circumferential direction by the grooves 41 and the annular grooves 42 and 43. Thus, the oblique side part 26 is easily mechanically deformed. The example described hereinbefore shows that two annular grooves 42 and 43 are provided. However, the number of the annular grooves is not limited to two. In addition, the annular grooves may be grooves further divided in the circumferential direction.

Third Embodiment

Next, the third embodiment of the accumulator according to the present invention will be described with reference to FIG. 8. The third embodiment is different from the first embodiment in a point that the grooves provided in the seal 20 are replaced with dimples. The same and duplicated configurations as the first embodiment will be omitted.

Figure 8A:
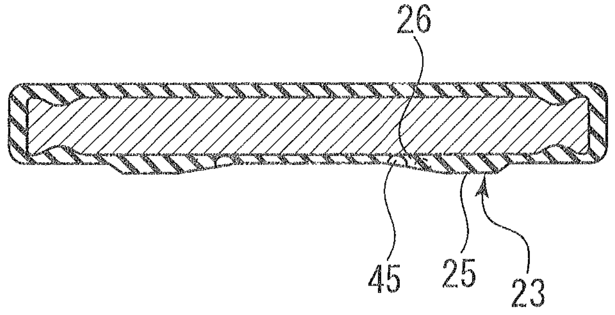
FIGS. 8A and 8B are views illustrating a seal in a third embodiment of the accumulator.
Figure 8B:
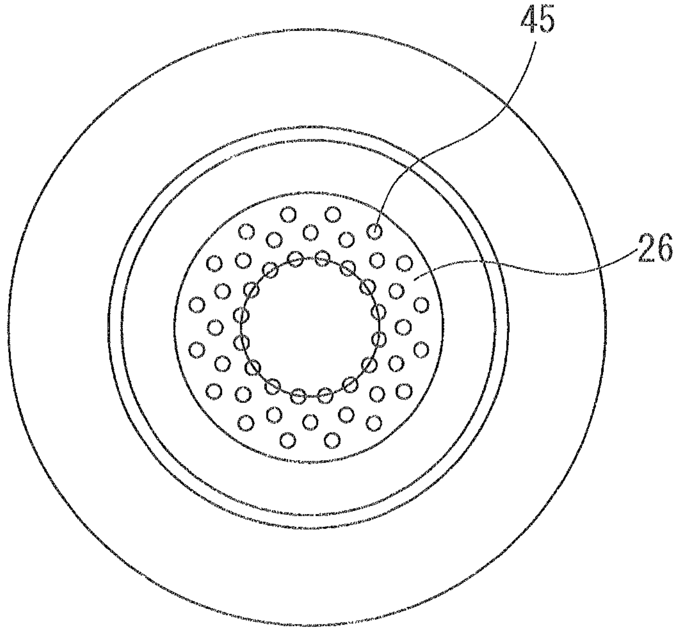

As shown in FIG. 8, dimples 45 (communication passages) are provided in the oblique side part 26. By providing the dimples 45 in such a way, at the time of shifting from the zero-down state to the normal running state, the pressure receiving area where the liquid pressure acts on the seal 20 is expanded, and the oblique side part 26 is formed in a easily mechanically deformable shape. Therefore, the seal 20 can be promptly separated from the stay 30.

Most parts of the dimples 45 do not communicate with the through hole 33 at the time of zero-down but are capable of enclosing the liquid pressure with the seating face 35. By doing this, at the time of zero-down, by the liquid pressure of this enclosed liquid, the separation force having a direction in which the seal 20 is separated upward acts on the seal 20, so as to contribute to more prompt separation of the seal 20 from the stay 30. Projections may be adopted in place of the dimples 45.

Fourth Embodiment

Next, the fourth embodiment of the accumulator according to the present invention will be described with reference to FIG. 9. The fourth embodiment is different from the first embodiment in a point that the grooves provided in the seal 20 are replaced with projecting streaks. The same and duplicated configurations as the first embodiment will be omitted.

Figure 9:
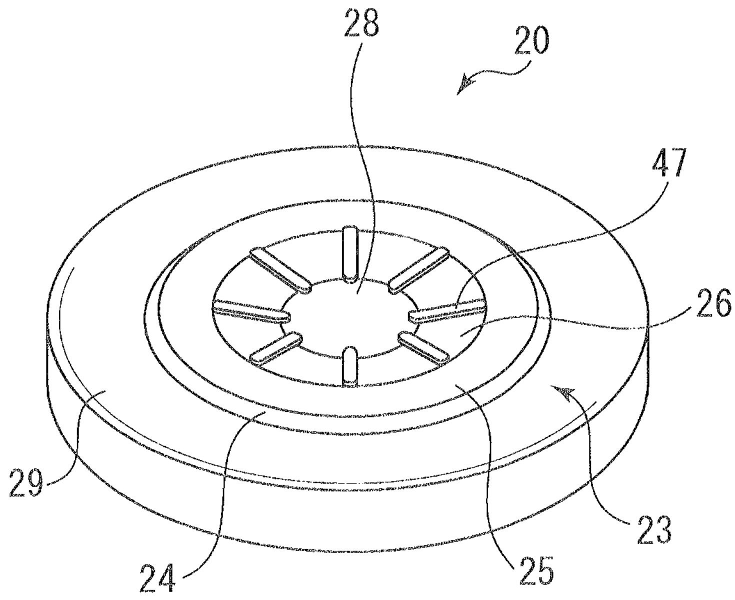
FIG. 9 is a perspective view illustrating a seal in a fourth embodiment of the accumulator.

As shown in FIG. 9, eight projecting streaks 47 are provided in the oblique side part 26 so as to radially extend. These projecting streaks 47 may be separate bodies from the rubber 22 but are desirably integrated with the rubber 22 for the purpose of strength and from a viewpoint of manufacturing workability. By providing the projecting streaks 47 in such a way, in the vicinity of both side faces of the projecting streaks 47, communication passages each having a substantially triangle section and communicating with the through hole 33 are formed between the rubber 22 of the seal 20 and the seating face 35 at the time of zero-down. Thus, at the time of shifting from the zero-down state to the normal running state, the pressure receiving area where the liquid pressure acts on the seal 20 is expanded. At the time of zero-down, high stress acts in the vicinity of the projecting streaks 47 and non-uniform stress acts in the circumferential direction of the oblique side part 26. Thus, the oblique side part 26 is formed in an easily mechanically deformable shape. Therefore, the seal 20 can be promptly separated from the stay 30.

Fifth Embodiment

Next, the fifth embodiment of the accumulator according to the present invention will be described with reference to FIG. 10. The fifth embodiment is different from the first embodiment in a point that the member in which the grooves are provided is the stay 30 in place of the seal 20. The same and duplicated configurations as the first embodiment will be omitted.

Figure 10:
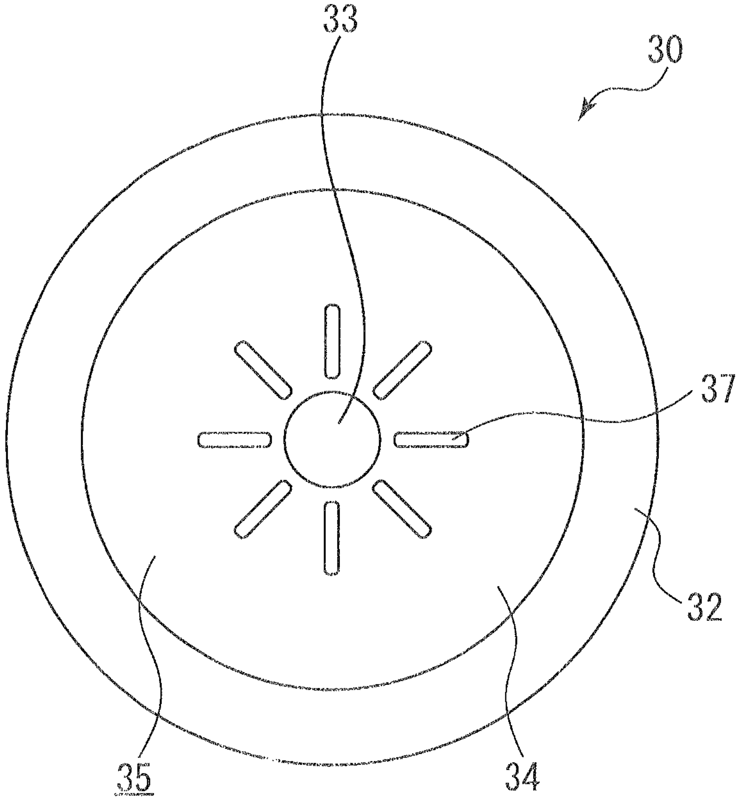
FIG. 10 is a plan view of a stay in a fifth embodiment.

As shown in FIG. 10, eight grooves 37 (communication passages) are provided on the upper face side of the bottom part 34 of the stay 30 so as to radially extend. Positions in the radial direction where the grooves 37 are provided, are determined so that the grooves 37 face the oblique side part 26 of the seal 20. By providing the grooves 37 in the stay 30 in such a way, at the time of shifting from the zero-down state to the normal running state, the pressure receiving area where the liquid pressure acts on the seal 20 is expanded. Therefore, the seal 20 can be promptly separated from the stay 30.

In a case where the grooves 37 are provided in the stay 30, the annular projecting part 23 of the seal 20 does not have a non-continuous part in the circumferential direction. Thus, this case is excellent in mechanical strength of the annular projecting part 23. Meanwhile, in a case where the grooves 27 are provided in the oblique side part 26 of the annular projecting part 23 as in the first embodiment, processing of formation of the grooves is easily performed.

In addition to the grooves 37 of the stay 30, the grooves 27 may be provided in the oblique side part 26 of the seal 20. In this case, the grooves 37 and the grooves 27 may be arranged at displaced positions in the circumferential direction or may be arranged at the same positions.

Sixth Embodiment

Next, the sixth embodiment of the accumulator according to the present invention will be described with reference to FIG. 11. The sixth embodiment is different from the first embodiment in a point that annular grooves are added to the flat part 25 of the seal 20. The same and duplicated configurations as the first embodiment will be omitted.

Figure 11A:
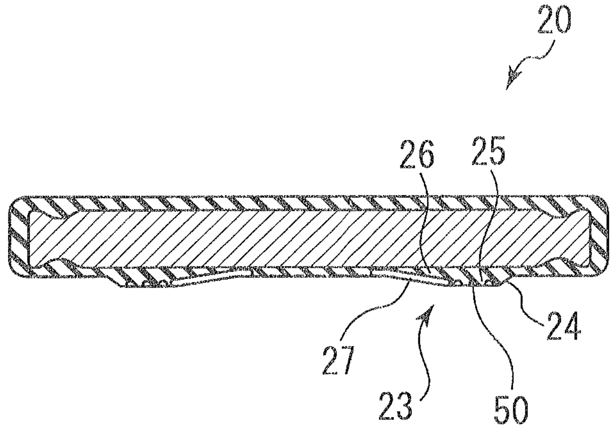
FIGS. 11A and 11B are views illustrating a seal in a sixth embodiment of the accumulator.
Figure 11B:
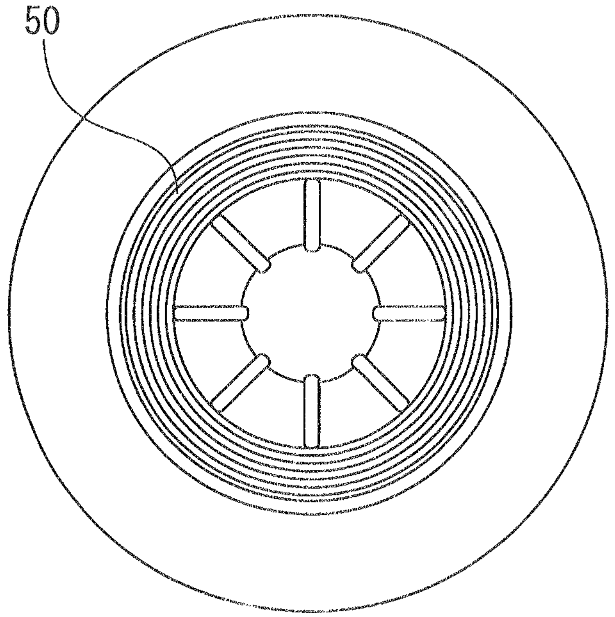

As shown in FIG. 11, three annular grooves 50 are provided on the lower end side of the flat part 25. By providing the annular grooves 50 in the flat part 25 in such a way, a contact area between the flat part 25 and the seating face 35 is reduced. Thus, at the time of shifting from the zero-down state to the normal running state, the seal 20 can be promptly separated from the stay 30. The number of the annular grooves 50 is not limited to three. In addition, the annular grooves may be grooves non-continuous in the circumferential direction.

Although the embodiments of the accumulator according to the present invention are described above with the drawings, specific configurations are not limited to these embodiments. The present invention also includes any modifications or additions made within the scope not departing from the gist of the present invention.

For example, the example that the communication passages communicating with the through hole 33 are formed so as to face the seating face 35 at the time of zero-down by the grooves 27, the grooves 37, and the projecting streaks 47 is described in the above first, second, fourth, and fifth embodiments. However, apart from the communication passages, grooves or dimples not communicating with the through hole may be provided as in the third embodiment. By doing so, the liquid is enclosed in a closed state by the grooves or the dimples at the time of zero-down. Thus, by the liquid pressure of this enclosed liquid, the separation force having a direction in which the seal 20 is separated upward acts on the seal 20, so as to be able to contribute to more prompt separation of the seal 20 from the stay 30.

Since the sealing part of the annular projecting part 23 is only required to exert a sealing function, the shape thereof does not have to be flat. Specifically, as shown in FIG. 11, not only the annular grooves 50 may be formed in the sealing part, but also the section of the sealing part may be a curved face.

Further, the annular projecting part 23 is described as an example of an elastic abutment part. However, the elastic abutment part is only required to be provided in the bellows cap 10 and have the buffering action of buffering force from the gas pressure and the sealing function, but is not limited to the shape in which the rubber 22 has the annular projecting part as described in the first to sixth embodiments. Further, even having the annular projecting part, the shape of the sealing part is not limited to a flat shape but may be other shapes such as a curved face shape, and the shape of the buffering part is not limited to the shape having oblique sides.

REFERENCE SIGNS LIST

1 Accumulator
2 Housing
3 Shell
4 Lid body
5 Oil port
6 Metal bellows
10 Bellows cap
13 Seal holder
17 Bellows
20 Seal
21 Rigid plate
22 Rubber
23 Annular projecting part (elastic abutment part)
24 Oblique side part
25 Flat part
26 Oblique side part
27 Groove (communication passage)
27A Pressure guiding part
28 Center part
29 Flat part

30 Stay
32 Standing part
33 Through hole
34 Bottom part
35 Seating face
37 Groove (communication passage)
40 Groove (communication passage)
41 Groove (communication passage)
42 Annular groove (communication passage)
43 Annular groove (communication passage)
45 Dimple (communication passage)
47 Projecting streak
50 Annular groove
F Pressing force
G Gas chamber
M Liquid chamber
Mc Closed liquid chamber
Mo Open liquid chamber

The invention claimed is:

1. An accumulator comprising:

a pressure container including a liquid pressure port connected to a pressure pipe;

a tubular bellows arranged telescopically along an inner wall of the pressure container;

a bellows cap configured to close one end of the bellows to divisionally define, in cooperation with the bellows, a liquid chamber communicating with the liquid pressure port and a gas chamber in which a pressure gas is enclosed; and a stay provided with a through hole, the stay partitioning the liquid chamber into a closed liquid chamber on a side of the bellows and an open liquid chamber on a side of the liquid pressure port wherein:

the bellows cap includes an elastic abutment part provided with an annular sealing part positioned around the through hole to face the through hole, and a buffering part positioned on a radially inner side of the sealing part;

communication passages always communicating with the through hole are formed in the buffering part of the elastic abutment part; and the communication passages comprise a plurality of radial grooves extending in a radial direction and at least one circumferential groove coupled to the radial grooves and extending in a circumferential direction.

2. The accumulator as set forth in claim 1, wherein:

the plurality of radial grooves of the communication passages are formed so as to be equiangularly arranged around the through hole of the stay upon an abutment of the stay and the sealing part of the elastic abutment part.

3. The accumulator as set forth in claim 2, wherein:

each of the plurality of radial grooves of the communication passages is extended radially and linearly from the through hole of the stay toward the sealing part.

* * * * *